US012600623B2

(12) United States Patent (10) Patent No.: US 12,600,623 B2
Akbari et al. (45) Date of Patent: Apr. 14, 2026

(54) METHOD FOR CONTINUOUSLY PRODUCING HYDROGEN USING AN EIGHT-PORT WAVE REFORMER

(71) Applicant: New Wave Hydrogen, Inc., Calgary (CA)

(72) Inventors: Pejman Akbari, Pasadena, CA (US); Colin D. Copeland, Pitt Meadows (CA); Stefan Tuchler, Bath (GB); Mark Davidson, Gainesville, FL (US)

(73) Assignee: New Wave Hydrogen, Inc., Calgary (CA)

( * ) Notice: Subject to any disclaimer, the term of this patent is extended or adjusted under 35 U.S.C. 154(b) by 890 days.

(21) Appl. No.: 17/825,170

(22) Filed: May 26, 2022

(65) Prior Publication Data

US 2022/0380211 A1 Dec. 1, 2022

Related U.S. Application Data

(60) Provisional application No. 63/193,400, filed on May 26, 2021.

(51) Int. Cl.
C01B 3/24 (2006.01)
(52) U.S. Cl.
CPC ........ C01B 3/24 (2013.01); *C01B 2203/0211* (2013.01)
(58) Field of Classification Search
None
See application file for complete search history.

(56) References Cited

U.S. PATENT DOCUMENTS

| | | | |
|---|---|---|---|
| 2,832,665 A | 4/1958 | Hertzberg et al. | |
| 2,832,666 A | 4/1958 | Hertzberg et al. | |
| 2,902,337 A | 9/1959 | Glick et al. | |
| 2,942,413 A | 6/1960 | Corbett | |
| 2,987,873 A | 6/1961 | Fox | |
| 3,235,341 A | 2/1966 | Hansel | |
| 3,251,648 A * | 5/1966 | Alexander | C01C 3/0212 585/407 |
| 3,254,960 A | 6/1966 | Hansel | |
| 3,262,757 A | 7/1966 | Bodmer | |
| 3,272,598 A | 9/1966 | Hansel | |
| 3,307,917 A | 3/1967 | Hansel et al. | |

(Continued)

FOREIGN PATENT DOCUMENTS

| | | |
|---|---|---|
| CA | 2930838 | 5/2015 |
| WO | WO2016001476 | 1/2016 |

(Continued)

OTHER PUBLICATIONS

EP Appln. No. 18747576.9—Extended European Search Report mailed Jan. 11, 2021.

(Continued)

*Primary Examiner* — Jelitza M Perez

(57) ABSTRACT

An improved hydrogen generation system comprising a multi-port wave reformer in which shock and expansion waves are created in a manner causing head-on colliding shock waves and multi-stage compression where reacting gases within a eight port wave reformer are heated and compressed to thermally crack or decompose one or more fuel sources, such as hydrocarbon fuels, to generate a fuel product containing hydrogen.

9 Claims, 9 Drawing Sheets

(56) References Cited

U.S. PATENT DOCUMENTS

| | | | |
|---|---|---|---|
| 3,307,918 | A | 3/1967 | Bodmer |
| 3,355,256 | A | 11/1967 | Hansel |
| 3,503,713 | A | 3/1970 | Hansel |
| 3,998,711 | A | 12/1976 | Hertzberg et al. |
| 4,160,813 | A | 7/1979 | Markel |
| 5,125,793 | A | 6/1992 | MacArthur |
| 5,300,216 | A | 4/1994 | Hertzberg et al. |
| 7,752,848 | B2 | 7/2010 | Balan et al. |
| 7,802,434 | B2 | 9/2010 | Vartharajan et al. |
| 9,365,775 | B1 | 6/2016 | La Crosse |
| 10,195,574 | B2 | 2/2019 | Bedard et al. |
| 10,384,180 | B2 | 8/2019 | Knowlen et al. |
| 2005/0072152 | A1 | 4/2005 | Suzuki et al. |
| 2009/0133400 | A1 | 5/2009 | Callas |
| 2010/0249468 | A1 | 9/2010 | Perkins |
| 2011/0060178 | A1 | 3/2011 | Nafis et al. |
| 2013/0048486 | A1 | 2/2013 | Castillo et al. |
| 2013/0192321 | A1 | 8/2013 | Cheily |
| 2014/0243569 | A1 | 8/2014 | Seppala et al. |
| 2014/0328749 | A1 | 11/2014 | Hammel et al. |
| 2018/0215615 | A1 | 8/2018 | Kielb |
| 2018/0355794 | A1 | 12/2018 | Bulat |
| 2021/0348557 | A1 | 11/2021 | Akbari et al. |

FOREIGN PATENT DOCUMENTS

| | | |
|---|---|---|
| WO | WO2018144595 | 8/2018 |
| WO | WO 2020/118417 | 6/2020 |

OTHER PUBLICATIONS

Akbari, P. et al., Numerical Simulation and Design of a Combustion Wave Rotor for Deflagrative and Detonative Propagation, 42nd AIAA Joint Propulsion Conference, Jul. 2006.

Moshrefi, M. et al., Methane Conversion to Hydrogen and Carbon Black by DC-Spark Discharge, Plasma Chem Plasma Process (2012) pp. 1167-1168.

Akbari, P. et al., Review of Recent Developments in Wave Rotor Combustion Technology, Journal of Propulsion and Power, vol. 25, No. 4, Jul.-Aug. 2009 pp. 833-844.

Akbari, P., Nalim, M.R., and Müller, N., "A Review of Wave Rotor Technology and Its Applications," ASME Journal of Engineering for Gas . . . vol. 128, No. 4, pp. 788-785 (1996).

Wilson, J. and Paxson, D.E., "Wave Rotor Optimization for Gas Turbine Topping Cycles," Journal of Propulsion and Power, vol. 12, No. 4, pp. 778-785 (1996).

Jones, S.M. and Welch, G.E., "Performance Benefits for Wave Rotor Topped Gas Turbine Engines," ASME, 41st Turbo Expo '96, Birmingham, UK (Jun. 10-13, 1996).

Zehnder, G. et al."Comprex® Pressure-Wave Supercharging for Automotive Diesels . . . " SAE Technical Paper Series 840132, International Congress & Exposition, (Feb. 27-Mar. 2, 1984).

Akbari, P. et al., "Performance Enhancement of Microturbine Engines . . . " ASME Journal of Engineering for Gas Turbines and Power, vol. 128, No. 1, pp. 190-202 (2006).

Welch, G.E., Jones, S.M., and Paxson, D.E., "Wave Rotor-Enhanced Gas Turbine Engines," Journal of Engineering for Gas Turbines and Power, vol. 119, No. 2, pp. 469-477 (1997).

Holmen, A., Olsvik, O., and Rokstad, O. A., "Pyrolysis of Natural Gas: Chemistry and Process Concepts," Fuel Process. Technol., 1995, vol. 42, pp. 249-267.

Gyarmathy, G., "How Does the Comprex Pressure-Wave Supercharger Work?," SAE Paper 830234, 1983.

Snyder, P. et al., "Assessment of a Wave Rotor Topped Demonstrator Gas Turbine . . . " ASME Paper 96-GT-41, International Gas Turbine . . . Birmingham, UK (Jun. 10-13, 1996).

Toulson, E., Schock, H., and Attard, W., "A Review of Pre-Chamber Initiated Jet Ignition Combustion Systems," SAE Technical Paper 2010-01-2263 (2010).

J.L. Lauer et al., "Continuous Shock Wave Reactor For Chemical Production and Reaction Studies," 22 Chem. Eng. Sci. 209-215 (1967).

P.H. Rose, "Potential Applications of Wave Machinery to Energy and Chemical . . . ," Proceedings of the 12th Int'l Symposium of Shock Tubes and Waves, Jerusalem, Israel (1979).

E.L. Klosterman et al., "The Use of an Unsteady Wave Chemical Reactor . . . Fuel Production," Proceedings of the 12th Int'l Symposium of Shock Tubes and Waves . . . , Israel (1979).

W.H. Christiansen et al., "Wave Machinery for Chemical Processing and High-Efficiency . . . ," Proceedings of the 20th Int'l Symposium on Shock Waves, Pasadena, CA (Jul. 1995).

Jurrian van der Dussen et al., "Design of a Process to Manufacture Ethylene From Ethane By Means of a Shock Wave Reactor," Delft Univ. of Technology (Jun. 2, 2006).

Marco W.M. van Goethem et al., "Ideal Chemical Conversion Concept for the Industrial Production . . . ," 46 Ind. Eng. Chem. Res. 4045-4062 (2007) (published on Web Oct. 13, 2006).

Erdin Kocak, "Embedding of Shock Wave Reactor in Thermal Cracking Process for Ethylene," Delft Univ. of Technology, Dept. of Chemical Technology and Material Science (May 2007).

A. Hertzberg, "Nitrogen Fixation for Fertilizers by Gasdynamic Techniques," Proceedings of the 10th Int'l Symposium on Shock Tubes, Kyoto, Japan (1975).

Akbari, P. et al., "Shock Wave Heating: A Novel Method for Low-Cost Hydrogen Production," ASME 2021 International Mechanical Engineering Congress, Nov. 2021.

PCT/CA2022/050645, Notification of Transmittal of ISR& Written Opinion, mailed Jul. 15, 2022.

PCT/CA2022/050645, International Search Report, mailed Jul. 15, 2022.

PCT/CA2022/050645, Written Opinion of the ISA, mailed Jul. 15, 2022.

PCT/CA2021/051789, International Search Report, mailed Mar. 8, 2022.

PCT/CA2021/051789, Written Opinion of the ISA, mailed Mar. 8, 2022.

Mohammad Mahdi Moshrefi et al., "Methane Conversion to Hydrogen and Carbon Black by DC-Spark Discharge," Plasma Chemistry and Plasma Processing . . . , vol. 32, No. 6, Sep. 9, 2012.

Carpenter, J.E., et al., An Existing Facility for SCRAM-JET Testing—The Wave Superheater, AIAA Journal, pp. 1701-1702, 1967.

Kielb, R., et al., Wave Rotors for Continuous, Vitiate-Free, High-Enthalpy Test Gas Generation, ,ACENT Labgoratories LLC, Hampoton, VA, Dec. 29014.

Carpenter, J.E., et al., "Wave Superheated Hypersonic Tunnel," Semiannual Report No. AD-1345-W-7, Cornell Aeronautical Laboratory, Buffalo, NY 1962.

Fang, Z., et al., Production of Hydrogen from Renewable Resources,: 2015.

Muradov, N., "Low to Near-Zero CO2 Production of Hydrogen from Fossil Fuels: Status and perspectives," Int J Hydrogen Energy, 2017, vol. 42, No. 20, pp. 14058-14088.

Tuchler et al., Validation of a Numerical . . . with Curved Channels, J. of Eng. for Gas Turbines & Power, 2020, vol. 142, No. 2, pp. 021017.

Muradov, Thermocatalytic CO2-Free Production of Hydrogen From Hydrocarbon Fuels, Proceedings of the 2000 Hydrogen Program Review, NREL/CP-570-28890 (2000).

Randy Vander Wal and Mpila Makiesse Nkiawete, "Carbons as Catalysts in Thermo-Catalytic Hydrocarbon Decomposition: A Review," 6 J. Carbon Res. 23, doi:10.3390/c6020023.

Mondal, K. C., Chandran, S. R., "Evaluation of the Economic Impact of Hydrogen . . . Reforming of Methane Process," Int J Hydrogen Energy, 2014, vol. 39, No. 18, pp. 9670-9674.

Abanades, A., "Low Carbon Production of Hydrogen by Methane Decarbonization," Chapter 6 in Production of Hydrogen from Renewable Resources, 2015, Springer, pp. 149-177.

A.T. Mattick et al., "Shock-Controlled Chemical Processing," Proceedings of the 19th Int'l Symposium on Shock Waves, Marseille, France (Jul. 1993).

(56) References Cited

OTHER PUBLICATIONS

L. Nill et al., "Design of a Supersonic Steam Tunnel for Use As a Shock Wave Reactor," AIAA 95-0016, 33rd Aerospace Sciences Meeting and Exhibit, Reno, NV (Jan. 1995).

Robert K. Masse, "Fluid Dynamics of the Shock Wave Reactor," Ph.D Thesis, Univ. of Washington, (2000).

C. Knowlen et al., "Petrochemical Pyrolysis With Shock Waves," AIAA 95-0402, 33rd Aerospace Sciences Meeting and Exhibit, Reno, NV (Jan. 1995).

A.T. Mattick et al., "Pyrolysis of Hydrocarbons Using a Shock Wave Reactor," Paper 3800, 21st Symposium on Shock Waves, Great Keppel Island, Australia (Jul. 1997).

PCT/IB2021/000305—ISR mailed Aug. 25, 2021.

PCT/IB2021/000305—Written Opinion mailed Aug. 25, 2021.

PCT/CA2021/051789—ISR mailed Mar. 8, 2022.

PCT/CA2021/051789—Written Opinion mailed Mar. 8, 2022.

Muradov, Thermocatalytic CO2-Free Production of Hydrogen From Hydrocarbon Fuels, Proceedings of the 2000 Hydrogen Program review, NREL/CP-50-28890 (2000).

\* cited by examiner

DRIVER FLUID OUTFLOW

DRIVER FLUID OUTFLOW

40

42

EXHAUST DUCTS CONNECTED
TO EXHAUST PORTS

18

CASING

SHAFT

ENDPLATES

ROTOR 14 10

CHANNELS

16

INLET DUCTS CONNECTED
TO INLET PORTS

30

32

DRIVER FLUID INFLOW

DRIVER FLUID INFLOW

HIGH-PRESSURE DRIVEN
GAS INCLUDING H₂

LOW-PRESSURE
DRIVER GAS (CH₄)

HIGH-PRESSURE DRIVER
GAS (PIPELINE CH₄)

LOW-PRESSURE
DRIVEN GAS (CH₄)

HIGH-PRESSURE DRIVER GAS (PIPELINE CH4)

LOW-PRESSURE DRIVER GAS (CH4)

HIGH-PRESSURE DRIVEN GAS INCLUDING H2

LOW-PRESSURE DRIVEN GAS (CH4)

DRIVER GAS INFLOW

DRIVER GAS INFLOW

PROCESSED GAS INFLOW

DRIVER GAS OUTFLOW

114

112

110

108

ENDPLATES

CASING 122

ROTOR 118   SHAFT 120

CHANNELS 116

ENDPLATES 106

DRIVER GAS INFLOW 104

DRIVER GAS INFLOW 102

REACTANT GAS INFLOW 100

METHOD FOR CONTINUOUSLY PRODUCING HYDROGEN USING AN EIGHT-PORT WAVE REFORMER

CROSS-REFERENCE TO CO-PENDING APPLICATIONS

The present invention is related to the following co-pending U.S. Patent applications, which are all commonly owned with the present application, the entire contents of each being hereby incorporated herein by reference thereto and claims the priority benefit of U.S. Provisional Application No. 63/193,400, filed May 26, 2021; as well as to U.S. patent application Ser. No. 17/307,621, filed on May 4, 2021; U.S. patent application Ser. No. 17/545,771, filed on Dec. 8, 2021; U.S. patent application Ser. No. 17/569,659, filed on Jan. 6, 2022; and to U.S. Pat. No. 11,220,428, dated Jan. 11, 2022.

BACKGROUND OF THE INVENTION

Field of the Invention

The present invention relates generally to hydrogen generation systems that include a wave reformer to thermally crack or decompose fuel sources, such as hydrocarbon fuels, to produce a fuel product containing hydrogen, and to methods of operating such systems.

Introduction—Description of Related Art

Considering the drawbacks of steam methane reforming, the decomposition of methane from natural gas provides a more environmentally friendly and efficient process. In this process, referred to as methane pyrolysis or methane cracking, methane is decomposed into its elements: hydrogen and solid carbon ($CH_4 \rightarrow C+2\ H_2$). The governing reaction is endothermic and the necessary energy input should be provided from different sources of energy. The main characteristic of this process is the absence of oxygen, which eliminates $CO_2$ and CO by-products, making the process very attractive. Additionally, no water is consumed, and the produced carbon can be marketed and used in a variety of areas, or it can be securely stored for future use. Different methods of methane decomposition processes have been developed including direct thermal cracking at very high temperature, catalyzed thermal decarbonization, and plasma-torch driven methane pyrolysis [See, Muradov, N., "Low to Near-Zero $CO_2$ Production of Hydrogen from Fossil Fuels: Status and perspectives," Int J Hydrogen Energy, 2017, Vol. 42, No. 20, pp:14058-88]. A limited number of these processes have been commercialized. These conversion processes differ in relation to the reactor type, the use of a catalyst, and the source of process-related energy. Among these methods, the direct thermal cracking is exclusively based on the heating of methane up to temperatures in which the kinetics of the reaction produces very high conversions in a reasonable time. To achieve these requirements, high temperatures are needed which demand costly energy inputs.

To efficiently achieve those high temperatures required for direct thermal methane decomposition, a wave reformer utilizing shock heating has been proposed in a previously published patent application US2018/0215615, entitled "Hydrocarbon Waver Reformer and Methods of Use," by New Wave Hydrogen (formerly Standing Wave Reformer) Inc., which is incorporated herein by reference in its entirety.

The invention overcomes some of disadvantages of the prior techniques by employing unsteady waves to produce high tems very rapidly with lower energy consumption per unit mass of product.

DESCRIPTION OF PRESENTLY PREFERRED EXAMPLES OF THE INVENTION

Brief Description of Figures

The invention is better understood by reading the following detailed description with reference to the accompanying drawings in which.

INTRODUCTION

Figure 1:
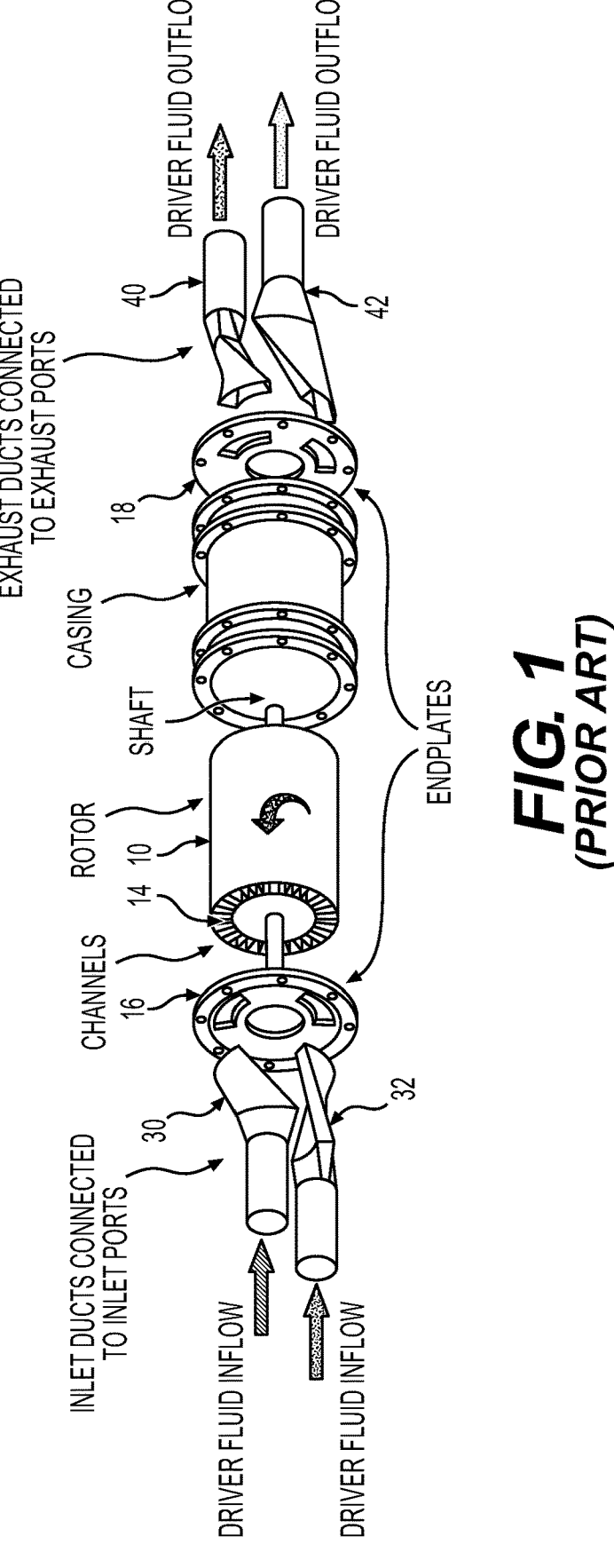
FIG. 1 (prior art) shows an expanded view of the four-port wave rotor.

Wave rotors are a direct energy exchange device that utilize one-dimensional pressure wave action for the transfer of mechanical energy between two compressible fluid flows which are at different pressure levels. [See, Akbari, P., Nalim, M. R., and Müller, N., "A Review of Wave Rotor Technology and Its Applications" ASME Journal of Engineering for Gas Turbines and Power, 2006, Vol. 128, No. 4, pp. 717-735]. As shown in FIG. 1, a wave rotor 10 typically consists of a cylindrical rotor 12 with an array of long axial channels 14 that are arranged uniformly around the rotor's periphery. The rotor 12 spins between two stationary endplates, 16 and 18, through which the flow enters and exists. Each endplate has a number of ports 20 to accommodate the incoming and outgoing fluids. Each of the rotating channels 14 operates as an individual shock tube. The entry and exit endplates, 16 and 18, function as the valves and resemble the partitions or diaphragms of the conventional form of shock tube, forming a series of unsteady compression and expansion waves within the channels as they periodically rotate past the inlet and exit ports 20 and regions of closed end walls. To generate compression waves, the channels 14 are exposed to a high-pressure port through which a driver gas which enters the channels 14 and compresses the gas within it. To generate expansion waves, the channels 14 are exposed to low-pressure port and the gas in the channels 14 discharges. Rotational motion of the drum 10 gives precise control of the wave processes. By using a sufficient number of channels on the fast-spinning drum, the pulsed process occurring in a single shock tube is translated to a nearly continuous process [See, Rose, P. H., "Potential Applications of Wave Machinery to Energy and Chemical Processes," Proceedings of the 12th International Symposium on Shock Tubes and Waves, 1979, pp. 3-30]. Therefore, the wave rotor can be considered as the steady flow analogue of the single pulse shock tube. Steady rotation of the drum establishes unsteady but periodic flow processes within the rotating passages and nearly steady flow in the inlet and outlet ports. In a typical design, the channels 14 are extend axially and arranged parallel to the drive shaft driven, for example, by an electric motor (or belt driven). In such a configuration, the only power input to the rotor 10 is that necessary to overcome bearing friction. However, if the tubes are not axial (e.g. curved channels), net power can be even extracted from the rotor similar to that of a turbine in addition to the work exchange between the fluid streams. [See, Richler, S., Copeland, C. D., "Validation of a Numerical Quasi-One-Dimensional Model for Wave Rotor Turbines with Curved Channels," J. of Eng. for Gas Turbines and Power, 2020, Vol. 142, No. 2, pp: 021017].

A variety of wave rotor configurations have been developed for different applications. The number and azimuthal location of the ports distinguish them for different purposes. For instance, four-port, five-port, and nine-port wave rotors have been investigated for gas turbine engine topping applications [See, Akbari, P., Nalim, M. R., and Müller, N., "A Review of Wave Rotor Technology and Its Applications" ASME Journal of Engineering for Gas Turbines and Power, 2006, Vol. 128, No. 4, pp. 717-735]. A four-port pressure exchange wave rotor is briefly discussed below to illustrate how it operates. A schematic of a four-port wave rotor is shown in FIG. 1 which uses two inlet ports, 30 and 32, and two outlet ports 40 and 42, respectively. Gaps between the rotor 10 and the faces of endplates 16 and 18 are exaggerated for clarity, but in practice to minimize gas leakage the gap is kept very small, or the endplates may use sealing material that contact the rotor. The driven (low-pressure fluid) enters the rotor 10 from an inlet port 32 at one end of the rotor. The rotor channels 14 filled with the driven gas are rotated to the driver (high-pressure fluid) gas inlet port 30. Due to the pressure difference between the driver and driven gases, the high-pressure driver gas is forced into the channels. This initiates shock waves that pass through the channels and compresses the lower pressure driven fluid already in the channels. The driver gas must be compressed sufficiently so that the required shock strengths are generated within the wave reactor. Continuous rotation of the drum places the channels between the closed portions of the end walls 16 and 18 that bring the channel flow to rest. The now energized driven fluid leaves the channels through the first outlet port 40 at the opposite end assisted by generated expansion waves. The low-pressure driver gas is then scavenged out of the drum through the secondary outlet port 42 by rotation, and the cycle then repeats itself. By carefully selecting port locations and their dimensions, a significant and efficient transfer of energy can be obtained between flows in the connected ducts with minor mixing effects at the gas interfaces. The net effect is an increase in stagnation pressure and temperature of the compressed gas and a decrease in stagnation pressure and temperature for the expanding gas, similar to turbo compressors and turbines. However, in turbo machines dynamic waves are replaced by mechanical blades for energy exchange between the fluids.

DETAILED DESCRIPTION OF THE INVENTION

Today hydrogen is mainly produced from natural gas by steam reforming. This method has its own draw backs including production of carbon dioxide which is widely accepted to lead to global warming. Renewable, zero carbon resources, such as steam are more suitable for supplying hydrogen. The commonly used method of obtaining green hydrogen from water or steam is an electrolysis process which is limited due to its high production cost resulting from the required input energy. The objective of the present invention is to overcome this difficulty by using unsteady shock waves to generate high temperatures very rapidly utilizing energy stored as high pressure, for example, high pressure gas pipelines. The invention introduces a novel method that results in methane cracking via shock wave heating. It is proposed to generate shock waves in a rotary reformer, termed as a wave reactor, to heat methane to extremely high temperatures very rapidly such that a thermal decomposition can takes place, resulting in the continuous production of hydrogen. This invention is also generally applicable to any process involving rapid heating of any reacting fluid like hydrocarbon fuel, but it is particularly unique in thermal dissociation of methane for hydrogen production.

Direct pyrolysis of hydrocarbons in wave reformers have been proposed by New Wave Hydrogen, Inc. In such a wave rotor-based fuel reformer, the energy (pressure) embodied in a pressurized natural gas pipeline (e.g. methane) is used to initiate shock waves in the reformer used for heating a hydrocarbon fuel and decomposing due to use of rapid shock compression. The wave reformer functions as an efficient energy exchanger where the high-pressure driver gas leverages the pressure of the driven gas (e.g. methane fuel), resulting in a rapid heating the driven gas to temperatures sufficient to crack fuel into hydrogen and carbon as a solid product. This novel technology offers optimal utilization of natural gas, as one of the largest energy reserves on earth, to produce clean hydrogen without emitting carbon dioxide with lower energy consumption than existing hydrocarbon reforming methods.

Figure 2:
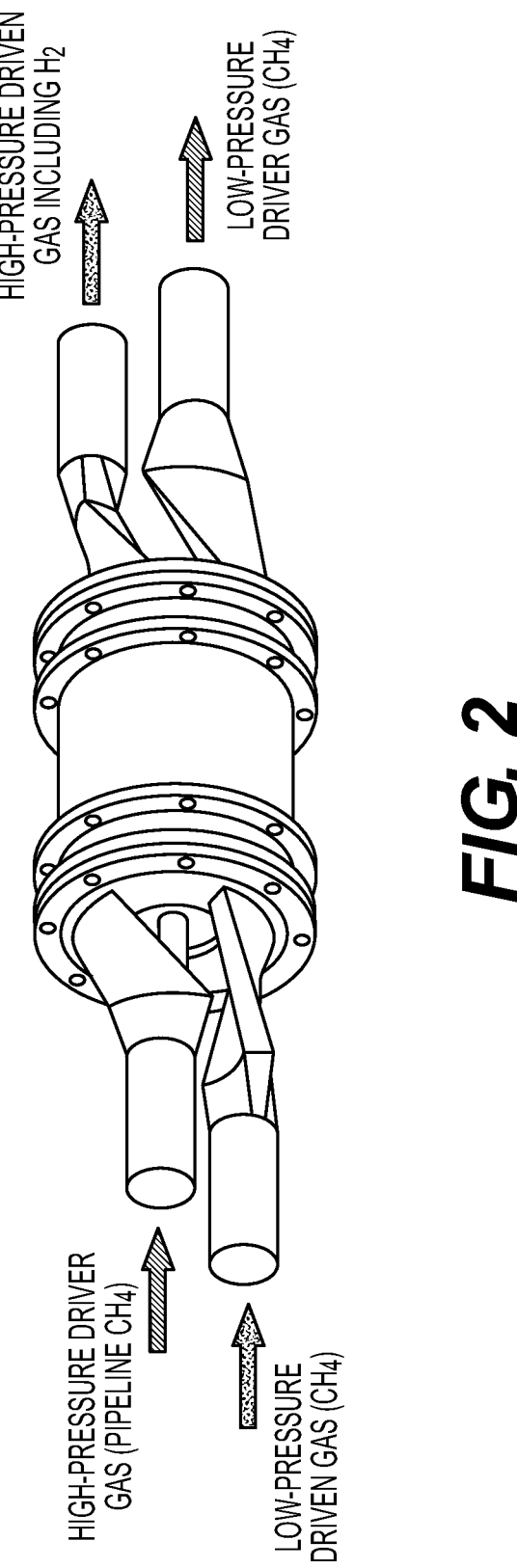
FIG. 2 (prior art) is a four-port wave reformer can be used to decompose methane into hydrogen and carbon.
Figure 3:
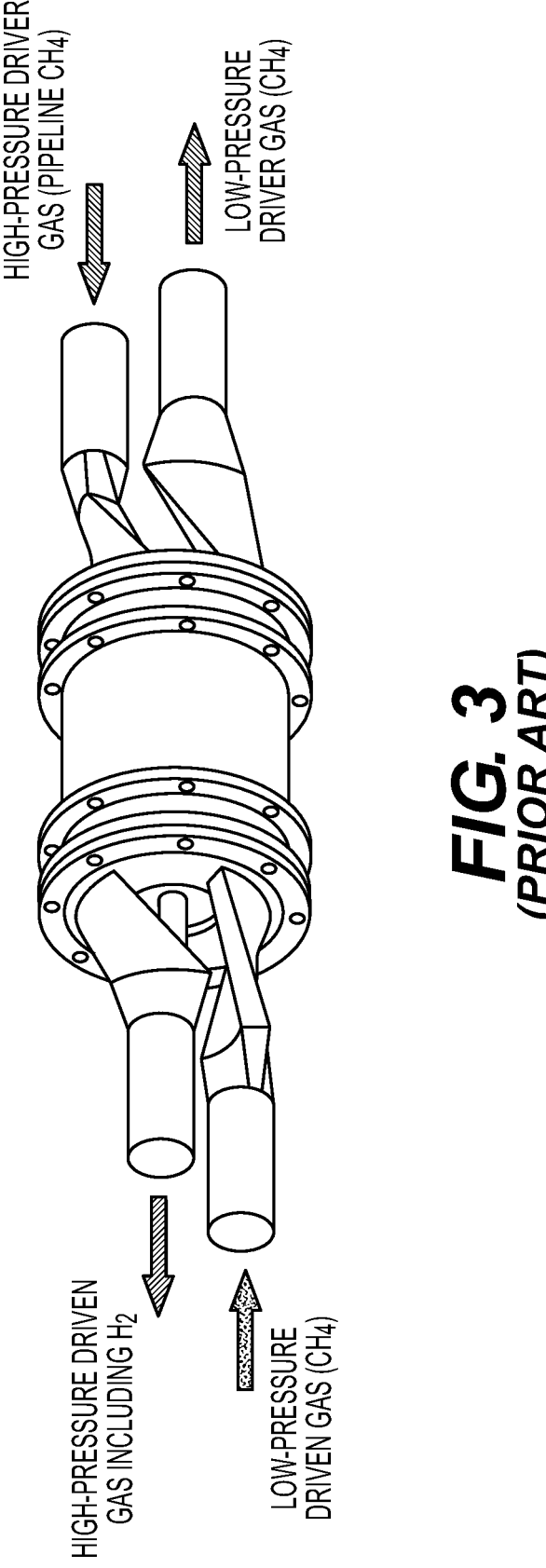
FIG. 3 (prior art) shows a reverse-flow wave reformer.

FIG. 2 represents how a four-port wave reformer can be used to decompose methane into hydrogen and carbon black. In the four-port wave rotor shown in FIGS. 1 and 2, inlet ports are located on one side of the rotor, and outlet ports are located on the other. This is knowns a through-flow configuration. Alternatively, it is possible to design a reverse-flow machine where each gas stream enters and leaves the channel from the same end. These two configurations may provide identical overall performance, but they differ substantially in their internal processes. FIG. 3 shows a reverse-flow wave reformer.

Figure 4:
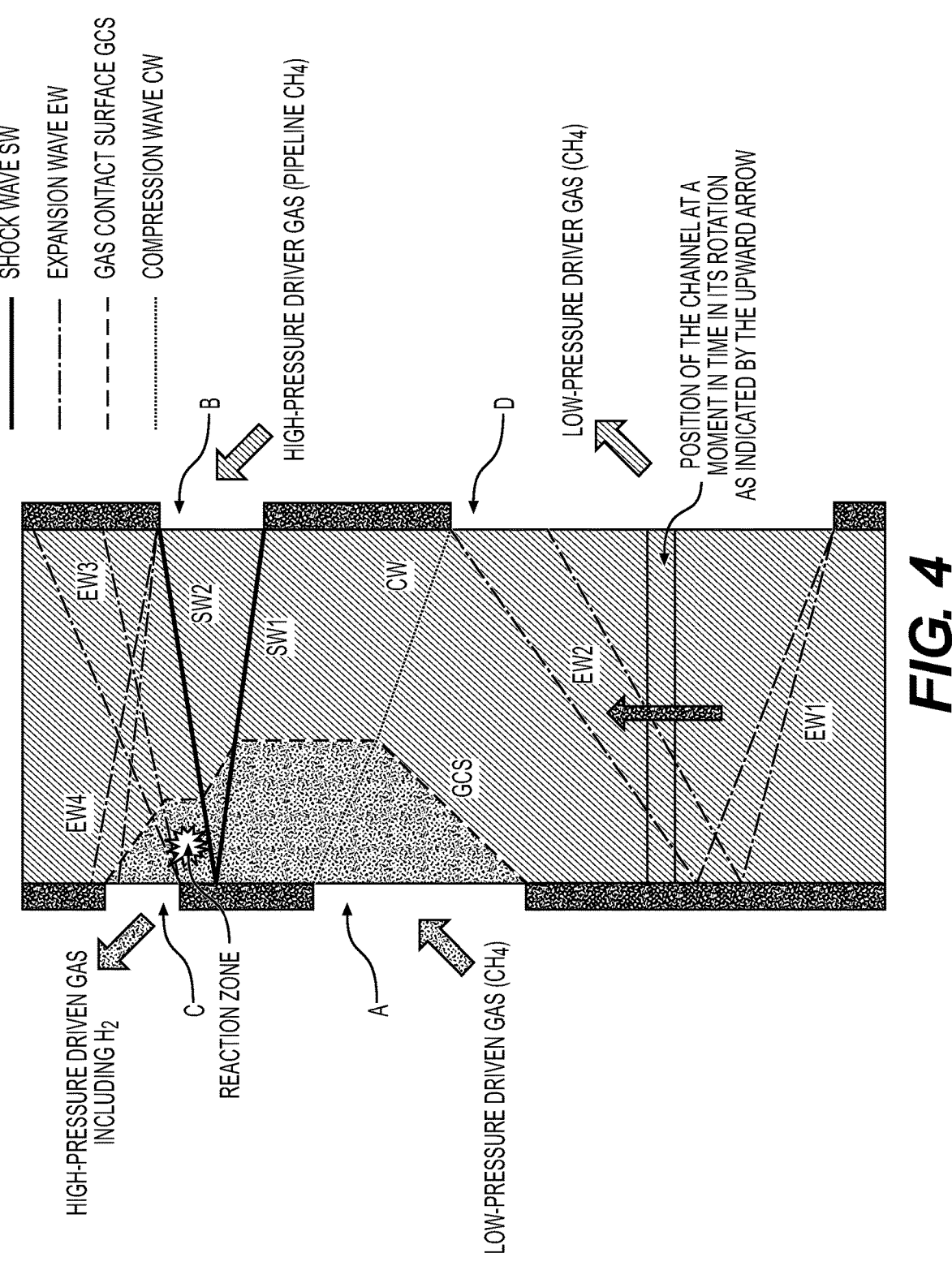
FIG. 4 shows a wave diagram showing the inner working principles and the unsteady flow process within a four-port wave reformer.

A wave diagram, as shown in FIG. 4, will assist one to understand the inner working principles and the unsteady flow process within wave reformers. Wave diagrams are helpful to predict flow fields occurring in the channels and generate new cycles or to guide a designer quickly to a choice between various wave cycle designs. A wave diagram is viewed as an x-t (distance-time) which is a time-history of the flow in any single wave rotor passage as it moves through the wave rotor cycle. Since the same things occur in each of the rotor channels, the operation can best be understood by explaining what happens in one of the rotor channels during one complete revolution of the drum. Wave diagrams can be viewed as an instantaneous snapshot of the flow in the entire rotor with the circular motion of the rotor channels is represented by straight translatory motion (i.e. unwrapped view of the rotor). FIG. 4 schematically illustrates an unwrapped demonstration of a reverse-flow wave reformer with the rotor channel moving upward or vertically in the figure. The wave diagram portrays the annular arrangement of the inlet and outlet ports, solid walls reflecting the endplates, the wave fronts, and gas interfaces during each phase of the cycle which is useful in visualizing the processes which occur in a single cycle of a wave machine. It should be understood that the top of each wave diagram is looped around and joined to the bottom of the diagram, i.e. each wave cycle is repetitive. The vertical solid lines on each side of the channels represent the stationary end walls that establish the portion of the cycle over which the inlet and outlet ports are closed. The diagonal lines are the propagation lines (trajectories) of the waves and contact surfaces (boundaries between the fluids). Wave interactions at interfaces are ignored. The light gray represents the low-pressure driven gas (e.g. methane) and the darker gray represents the driver gas (e.g. pipeline natural gas). Each cycle consists of two inflow ports, A and B, where ingress of the fresh high pressure driver gas and low-pressure driven gas or fluids are fed into the moving channels, and two outflow ports, C and D, where the energized high-pressure driven gas (from port C) and de-energized low-pressure driver gas (from port D) are discharged from the rotor channels. For fuel reforming application, a pre-heated hydrocarbon fuel (e.g. methane) will be chosen as the reacting gas, and pre-heated pressurized natural gas supply will be selected as the driver gas. The pressure ratio between the reactant gas and driver gas is a factor determining the strength of the shock wave generated. The required pressure ratio will depend upon the reaction temperature desired to be produced for the processing of a particular reactant gas. The process can be made more efficient by either pre-heating the driver gas or pre-heating the driver gas, reducing the pressure ratio required for the process. By pre-heating these gases, the increment of temperature rise in the reactant gas that must be produced by action of the shock wave to reach the elevated temperature at which the particular chemical reaction is intended to take place will be smaller.

In the following, the events occurring in a channel during one complete cycle will be described and it will be described in detail how shock and expansion waves are neatly employed to transfer the energy directly between the gases and generate hydrogen in the wave reformer. In FIG. 4, the cycle begins in the bottom part of the wave diagram where the flow within the channel consists of a large part of the fresh driver gas and some residual of the driver gas from a previous cycle. As the right end of the channel opens to the relatively low-pressure outlet port D, an expansion fan EW1 originates from the leading edge of the outlet port D and propagates into the channel, expanding and discharging the used driver gas to the surrounding. The expansion fan EW1 reflects off the left wall as EW2 and further reduces the pressure and temperature in the channel. This draws fresh low-pressure driven gas, the reacting gas (light gray), into the channel when the inlet port A starts to open on the left side of the channel. This entering reacting (driven) gas is separated from the residual (driver) gas (darker gray) by a contact surface shown at GCS. When the reflected expansion fan EW2 reaches the upper edge of exhaust port D, it slows the outflow and reflects back to the left as a compression wave CW. The compression wave CW travels toward the inlet port A stopping the channel flow. As the compression wave CW reaches the upper corner of the inlet port A, that port closes gradually. At this moment, the channel is closed at both ends filled with the reacting gas separated from the residual gas by a contact surface GCS denoted by a vertical line, and the channel fluid is at rest relative to the rotor. Through continuous rotation of the rotor, the fresh driver gas entry port B opens, and the channel right end is exposed to the high-pressure driver gas. Because the driver gas pressure is higher than the gas pressure in the channel, a shock wave SW1 is triggered starting from the lower corner of the high-pressure inlet port B. The shock wave SW1 runs to the left through the channel and causes an abrupt rise of pressure and temperature inside the channel. Behind the shock wave SW1, the compressed fresh driven gas, residual gas, and the driver gas are separated through two gas interfaces along CGS. As the shock wave SW1 reaches the end of the channel, a reflected shock wave SW2 is generated, propagating to the right back into the channel which compresses the channel fluid further. Passage of the shock waves SW1 and SW2 through the reactant gas raises it to reaction temperature, thus thermal decomposition of the fuel occurs behind the reflected wave in a hot reaction zone. When the secondary outlet port C opens, the doubled-compressed reacting product (e.g. hydrogen and any intermediaries) is expelled from the channel by an expansion fan EW3 generated at the lower corner of the outlet port C propagating downstream toward the inlet endplate. The closure of the inlet port B is timed with the arrival of the reflected shock wave SW2. At this moment, another expansion fan EW4 originates from the upper corner of the inlet port B and propagates to the left toward the other end of the channel which eventually brings the channel flow to rest. When the expansion fan EW4 reaches the end of the channel, the outlet port C closes and the flow in the rotor channels stops and contains the fresh driver gas plus some residual gas. At this point, the channel will go through the same cycle process. The described sequence of events occurs successively in each of the reactor channels as the drum is rotated so that a continuous supply of processed gas is discharged into the outlet port.

Thermal methane cracking without the presence of a catalyst can take place above 1000° C. with sufficient residence time. Nevertheless, at this temperature, the kinetics of the reaction are relatively low. Studies show that around 1200° C., the full conversion of methane into hydrogen is theoretically feasible, however it strongly depends on the kinetics of the reaction in an experimental set up. Temperatures above 1400-1500° C. are realistic for practical non-catalytic implementations [See, Abanades, A., "Low Carbon Production of Hydrogen by Methane Decarbonization," Chapter 6 in *Production of Hydrogen from Renewable Resources*, 2015, Springer, pp: 149-177; and Holmen, A., Olsvik, O., and Rokstad, O. A., "Pyrolysis of Natural Gas: Chemistry and Process Concepts," Fuel Process. Technol., 1995, Vol. 42, pp. 249-267]. The hydrocarbons are thermodynamically unstable at such high temperatures and the only products would be carbon and hydrogen if the reaction time is long enough to reach equilibrium.

Figure 5:
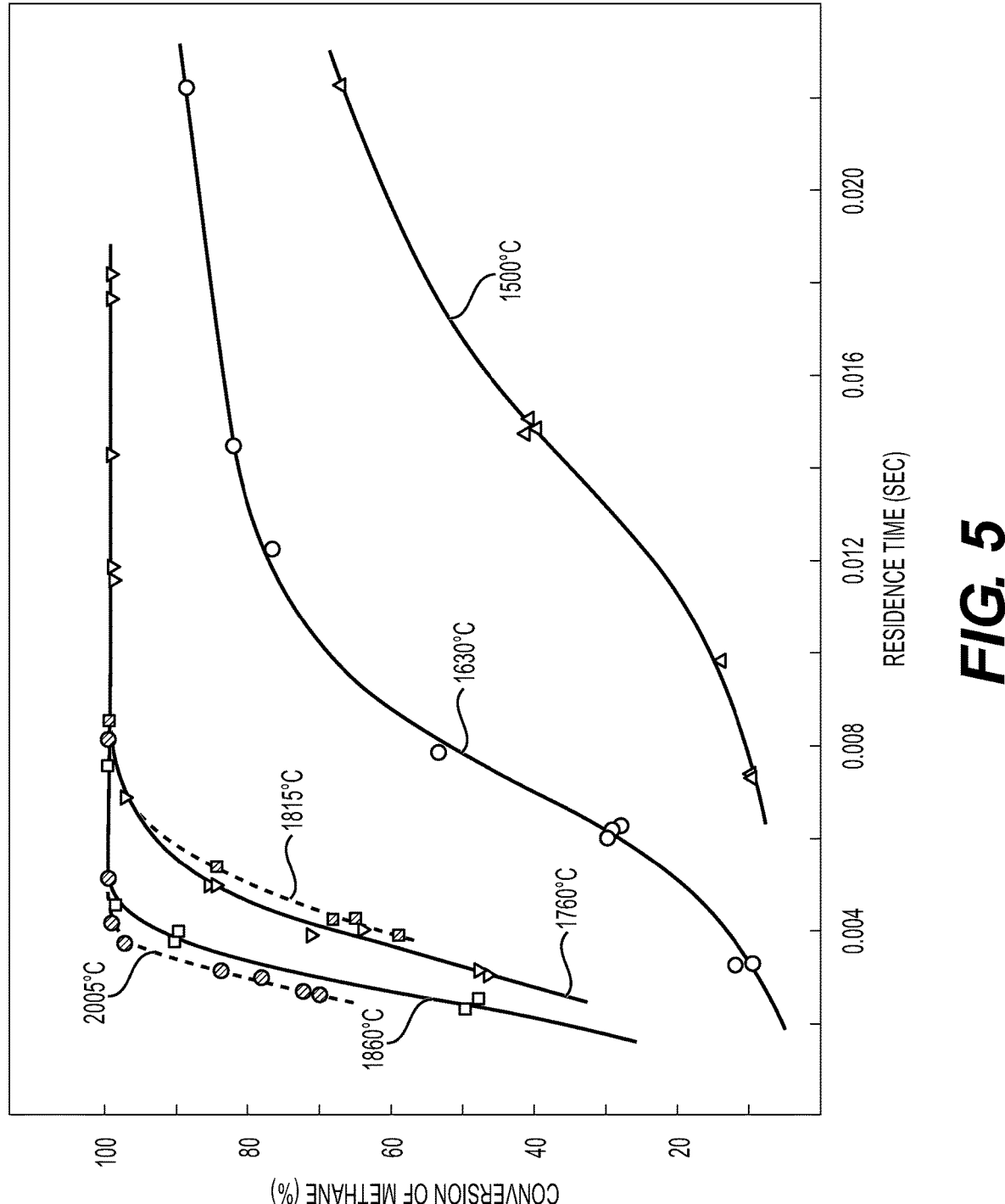
FIG. 5 shows the conversion of methane at different temperatures.

FIG. 5, which is from Holmen, A., Olsvik, O., and Rokstad, O. A., "Pyrolysis of Natural Gas: Chemistry and Process Concepts," Fuel Process. Technol., 1995, Vol. 42, pp. 249-267, shows the conversion of methane at different temperatures. For example, FIG. 5 shows that for a 40% methane conversation, about 3 millisecond residence time would be required at 1860° C. temperature. Meanwhile, at a lower temperature of 1500° C., a longer reaction time of about 15 milliseconds is required to obtain the same yield of methane. In a wave reformer, temperatures in excess of 2000° C. can be generated behind the reflected shock wave, but in practice the peak temperature in the reaction zone decreases as the reaction takes place because the methane-pyrolysis reaction is endothermic. Thus, at a lower temperature a longer residence time is required in the device to maintain maximum yield of hydrogen. The residence time in the flow diagram of a wave reformer shown in FIG. 4 starts from the arrival of the primary shock wave to the channel end wall and its reflection from the rigid wall. It only lasts before the opening of the processed gas outlet port when the processed gas is rapidly cooled by the expansion waves and expelled or scavenged from the downstream end of the channel. Ideally, this reaction time can be changed by adjusting the rotor speed, the rotor length, and port conditions. However, the rotor speed and the position and width of the ports are already selected with the speed of the propagating waves to avoid all undesired flow phenomena in the device, leading to a favorable well-tuned wave pattern [See, U.S. Pat. No. 2,902,337, Glick, H. S., Hertzberg, A., Squire, W., and Wetherston, R., 1959, "Methods for Heating and Cooling Gases and Apparatus Therefor,"]. Therefore, it is beneficial to increase the residence time when the reaction at a peak temperature can be prolonged. This invention introduces a wave cycle that promotes longer residence time hydrogen formation for a higher fuel-to-hydrogen conversion.

In the wave diagram of FIG. 4, the peak temperatures and pressures occur adjacent to an endplate where the shock waves are reflected from the wall. Allowing the shock wave to reflect from a rigid wall is an effective way to create very high temperature, but excess heat transfer to the endplate over a long period of operating the reformer could be problematic. Additionally, because the channels are spinning at a high speed and the endplate is stationary, the seal between the stationary endplate and the channels could suffer from high temperatures and pressures in that region. To avoid this problem, Hertzberg et al. proposed an alternative cycle that eliminated the need for a seal at the region where the high temperatures and pressures occur in the reactor [See, U.S. Pat. No. 2,902,337; and, U.S. Pat. No. 3,998,711, Hertzberg, A., and Christiansen, W., 1976, "Method for Continuously Carrying Out a Gas Phase Reaction and Apparatus Therefore,"]. In this proposed cycle, the reaction zone is designed to be placed in an intermediate or middle section of the channel, thereby the region of high temperature and pressure occurs in the central portion of the process gas column and not at an end which must be sealed against a reflecting plate. This can be done by simultaneously introduction of opposing pairs of shock waves at opposite ends of the channels.

Figure 6:
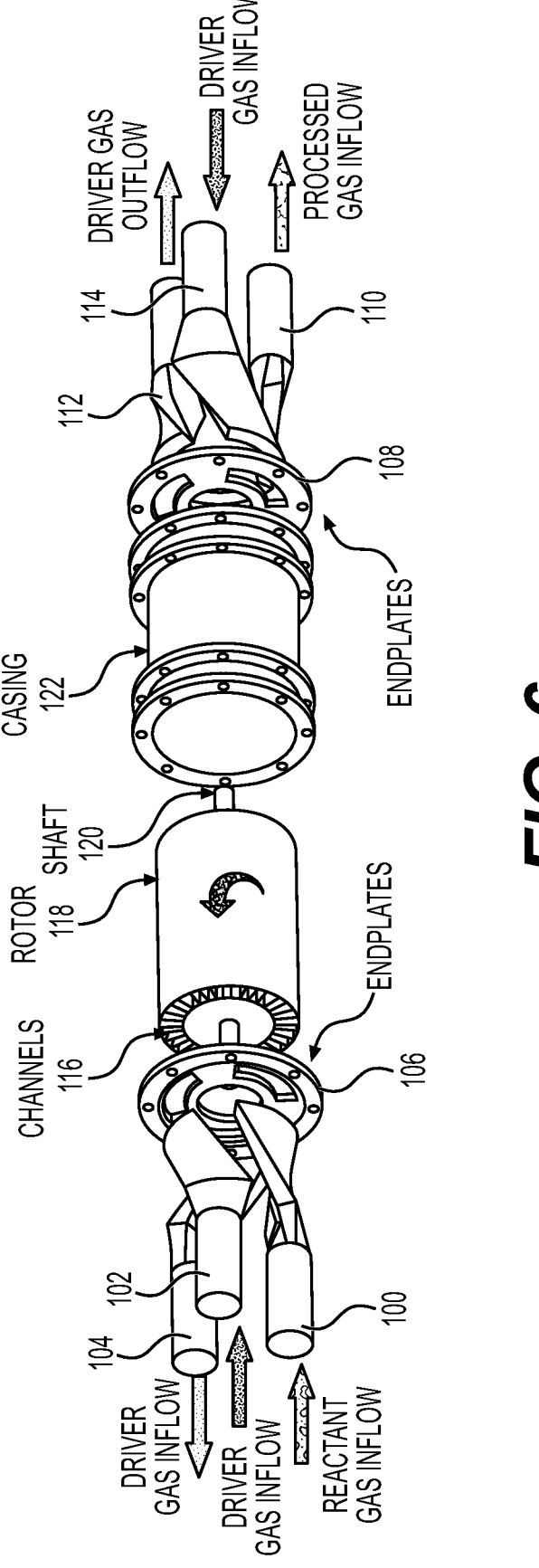
FIG. 6 schematically shows a schematic configuration of a six-port wave reactor.

FIG. 6 shows a schematic drawing of six-port wave reactor with three ducts/ports 100, 102 and 104 placed on the left endplate 106 and another three ducts/ports 110, 112 and 114, on the right endplate 108. The six-port wave reactor also includes an outer casing 122, an inner rotor 118, spinning on a shaft, and a plurality of channels 116 that extend axially along the rotor 118. A driven or reacting fluid (e.g. a gaseous fuel) enters the rotor from an inlet port 100 at left end of the rotor 118 and after it is processed (e.g. product), it leaves at opposite end of the rotor using an outlet port 110. A pair of driver gases enter via ports 102 and 112 and leave at each opposite end of the rotor as shown at ports 104 and 114, respectively. Thus, the rotor experiences a through-flow pattern by the driven reacting gas and a reverse-flow pattern by the driver fluids. The compression energy contained in the high-pressure driver fluids is used to compress the low-pressure driven fluid. Thus, the wave pattern within the spinning channels energizes the driven fluid, and it leaves the rotor at higher pressure than it had upon entering the rotor. Thus, the energy gain in the driven gas is made up by a corresponding energy loss in the driver gas loop. This is similar to wave processes occurring in conventional wave rotors.

Figure 7:
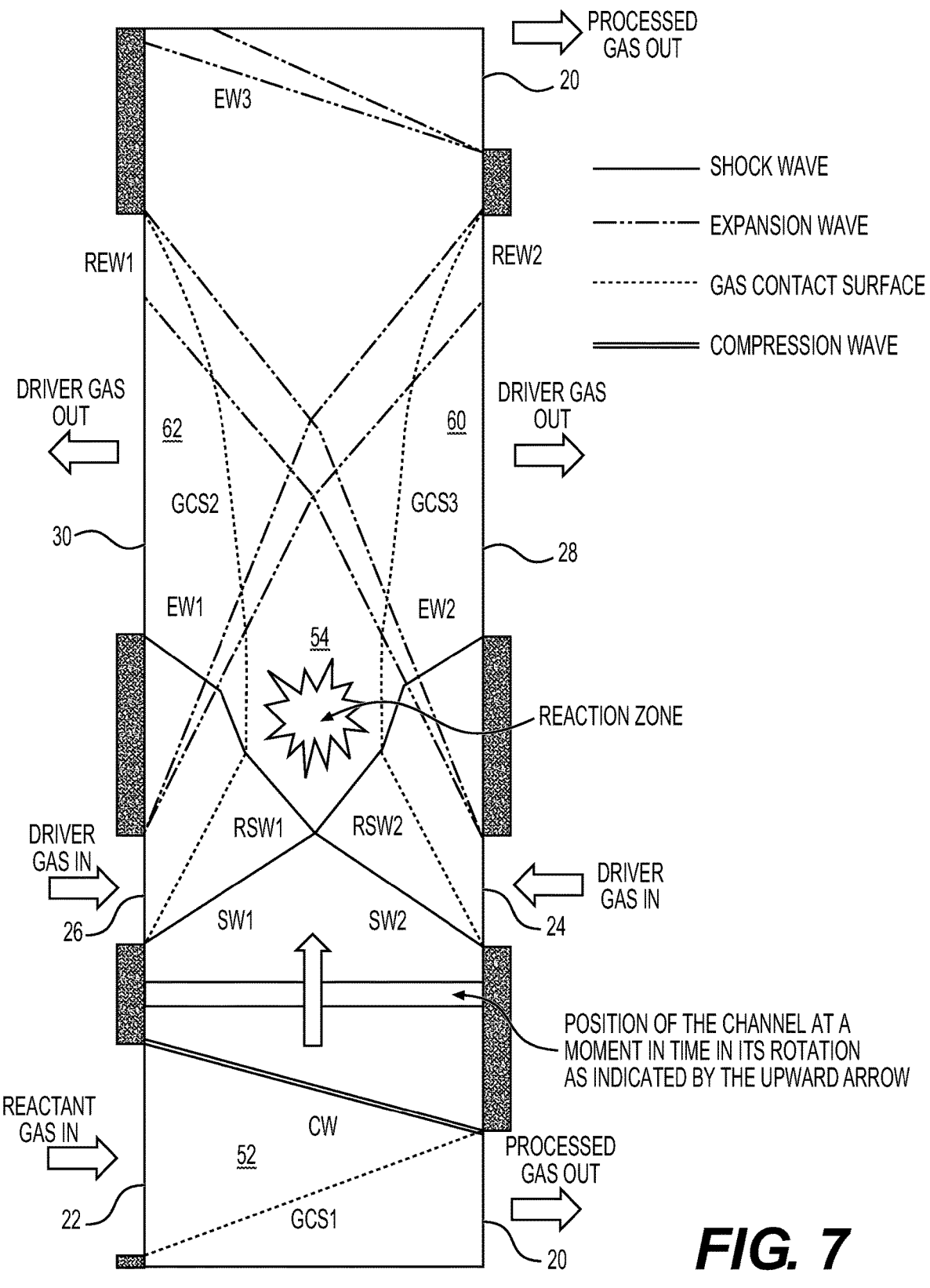
FIG. 7 shows a wave diagram showing the inner working principles and flow process within a six-port wave reactor.

FIG. 7 schematically illustrates wave diagram within the six-port wave reactor. Because reflecting a shock wave from a plane wall is analogous to the head-on collision of two shock waves of equal strength [See, Glass I. I., Patterson, G. N., 1955, "A Theoretical and Experimental Study of Shock-Tube Flows," Journal of Aeronautical Sciences, Vol. 22, No. 2, pp: 73-100], thus, wave diagram shown in FIG. 7 is expected to provide a similar heating process for the reactant gas comparable with that in the cycle described in FIG. 4 without end wall-effects.

In FIG. 7, the present process begins at the bottom of the wave diagram where the low-pressure reactant fluid or gas entry port 22 opens at left side of diagram. The fresh reactant fluid 52 is charged into the upstream end of the channel (left side of diagram) while the processed fluid (e.g. product) is being discharged from the downstream end of the channel (right side of diagram) through an exhaust port 20. This is considered as the overlap process in which both channel ends at the bottom of the figure are open. A gas contact surface (GCS1) separates the fresh reacting gas 52 from the exhaust gas. When the entire channel is filled with the fresh reacting gas, the exit port 20 closes. By closing the outflow port 20, a compression wave CW (doubled solid line) is generated from the upper corner of the exit port 20 propagating to the left. The channel flow is brought to rest by this moving wave CW (a.k.a. hammer shock), which raises the pressure in the channel. When the compression wave CW meets the upper corner of the inlet port 22, the ingestion of the fresh gas into the channel is stopped. At this instance, the channel is fully filled with the pre-compressed fresh reacting gas. As the channel rotates further, the channel ends are exposed to high-pressure driver gas entry ports 24 and 26. Because the driver gas pressure is higher than the pressure in the channel, two identical primary shock waves SW1 and SW2, are triggered starting from the lower corners of the inlet ports 24 and 26. These primary shock waves SW1 and SW2 propagate toward each other and after colliding cause a sudden rise of pressure and temperature inside the channel in a reaction zone. Meanwhile, the driver gas entry ports 24 and 26 start to close. Because the velocity of the gas in contact with the closed end wall must be zero, expansion waves EW1 and EW2 are generated and propagated into the channel moving gas, bringing it to rest. Expansion waves EW1 and EW2 (dashed-dotted line) are generated from the upper corners of the entry ports 24 and 26 propagating toward the center of the channel reducing the pressure and temperature of the channel gas. Behind the primary shock waves SW1 and SW2, the compressed reacting gas and the driver gases 60 and 62 are separated through two contact surfaces GCS2 and GCS3 as the compression process is carried out. These contact surfaces (showing the progression of the two fluids) follow the shock waves SW1 and SW2 at a slower rate. The symmetric pairs of primary shock waves SW1 and SW2 collide in the middle of the channel and generate a pair of reflected shock waves RSW1 and RSW2. The pressure and temperature of the reacting gas in the reflection zone behind the reflected shock waves RSW1 and RSW2 rise further and the double-compressed gas 54 is brought to rest indicated by contact surfaces turning into vertical lines. If a reacting gas like methane is selected as the driven gas, with sufficient compression by the primary and reflected shock waves, thermal dissociation of the gas to hydrogen occurs in the substantially motionless heated zone behind the reflected waves. Motionless refers to the average bulk motion of the portion of gas under consideration. While individual portions of the gas may be in motion, the motionless gas volume in question remains substantially in place along the axis of the channel. Sufficient residence time for fluid decomposition can be provided by adjusting the rotor speed, the rotor length, and port conditions. The peak temperature in the reaction zone depends on the initial temperature of the reacting gas and Mach number of the primary shock waves. Time for this maximum temperature only lasts enough before the arrival of the expansion wave fronts caused by the closing of the driver inlet ports. The expansion waves rapidly cool the reactant, so the expansion wave front arrival time limits the duration of the peak temperature. Heating and compression of the gas in the middle of the channel avoids sealing challenge associated with channel end compression.

The reflected waves RSW1 and RSW2 resulting from the colliding opposing shocks propagate back toward the downstream ends of the channel and pass through the opposing expansion waves EW1 and EW2.

Discharging of the channel gas to the surrounding starts by opening the driver exhaust gas ports 28 and 30 that is timed with the arrival of the reflected shock waves RSW1 and RSW2 to the leading corners of the exit ports 28 and 30. By opening the ports 28 and 30, the driver gases 60 and 62 leave the channel from both ends at a lower pressure than when they entered the rotor. The driver gases are separated by contact surfaces GCS2 and GCS3 from the compressed reacting (driven) fluid. The scavenging of the driver gases through the exit ports 28 and 30 is stopped by closing the exhaust ports 28 and 30. Similar to the primary shock waves SW1 and SW2, the expansion waves EW1 and EW2 also collide in the middle of the channel and reflected as REW1 and REW2, respectively. The closing of the exhaust ports 28 and 30 is timed with the arrival of the processed gas to the ends of the channel as well as with the arrival of the reflected expansion waves REW1 and REW2 to the upper corners of the exit ports 28 and 30. At this moment, the channel is entirely filled with the processed-driven fluid. Finally, decomposed gas (e.g. hydrogen and any intermediaries) is expelled from the channel by another expansion wave EW3 generated from the leading corner of this exhaust port 20. The discharged gas from the channels is at a pressure higher than that which it had upon entering the rotor prior to compression of the reactant. Opening of the driven gas port 22 is timed with the arrival of the expansion wave EW3 to the left end of the channel to allow fresh reacting gas enters the channel and the cycle repeats itself.

In practice, wave location deviate from these idealized conditions as the wave interactions and wave reflections are inevitable. Also, fluid mixing at gas/gas interfaces are not shown in these simplified wave cycles. Interface skewing, boundary layer flow dynamics, and passage gradual opening/closing influence wave patterns and flow fields within the wave rotor channels and not well described by one-dimensional illustrations. Additionally, the performance of wave rotors is severely impacted by real processes not indicated on the wave diagram. Multi-dimensional numerical modeling can reveal those details. Still, the above simplified wave process is expected to agree sufficiently closely to the actual processes that take place in the wave reactor.

Figure 8:
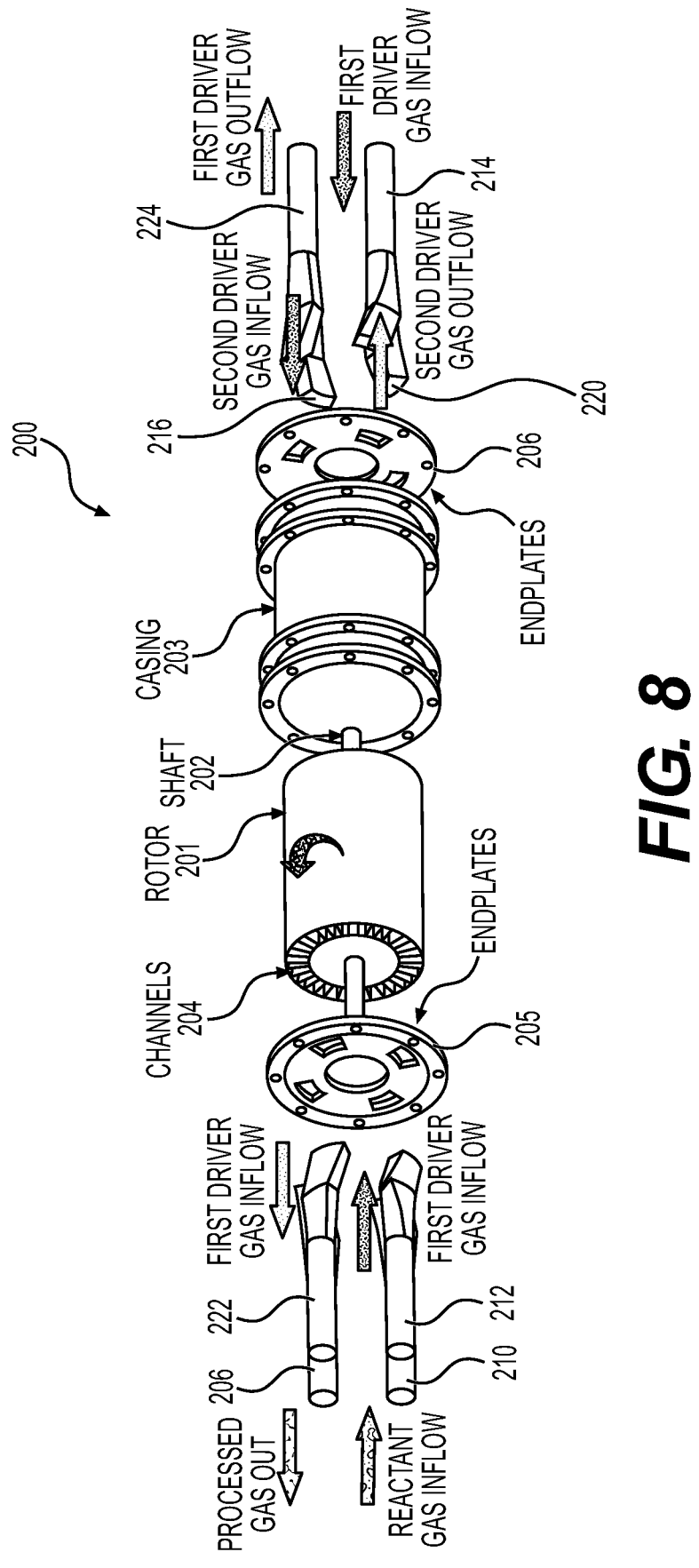
FIG. 8 shows an eight-port wave reformer.

FIG. 8 shows a wave reactor 200 using dual-stage compression and opposing pairs of shock waves which is comprised of a rotor 201 supported by shaft 202 rotating within an outer casing 203. Rotor 201 includes a plurality of axially extending channels 204 and at each end is an end plate or wall 205 and 206, respectively. It is proposed to design a new wave cycle that benefits from above-described head-on colliding shock waves and dual-stage compression where the reacting gas, for example, conventional hydrocarbon fuels ($C_xH_y$ where x and y represent different fuels, for instance x=1 and y=4 represents Methane $CH_4$) or Ammonia. The fuel is heated and compressed a few times by shock waves, as schematically shown in FIG. 8. In this arrangement the endplates 205 and 206 are provided with four inflow ports, 210, 212, 214, and 216, and four outflow ports 220, 222, 224 and 226.

Figure 9:
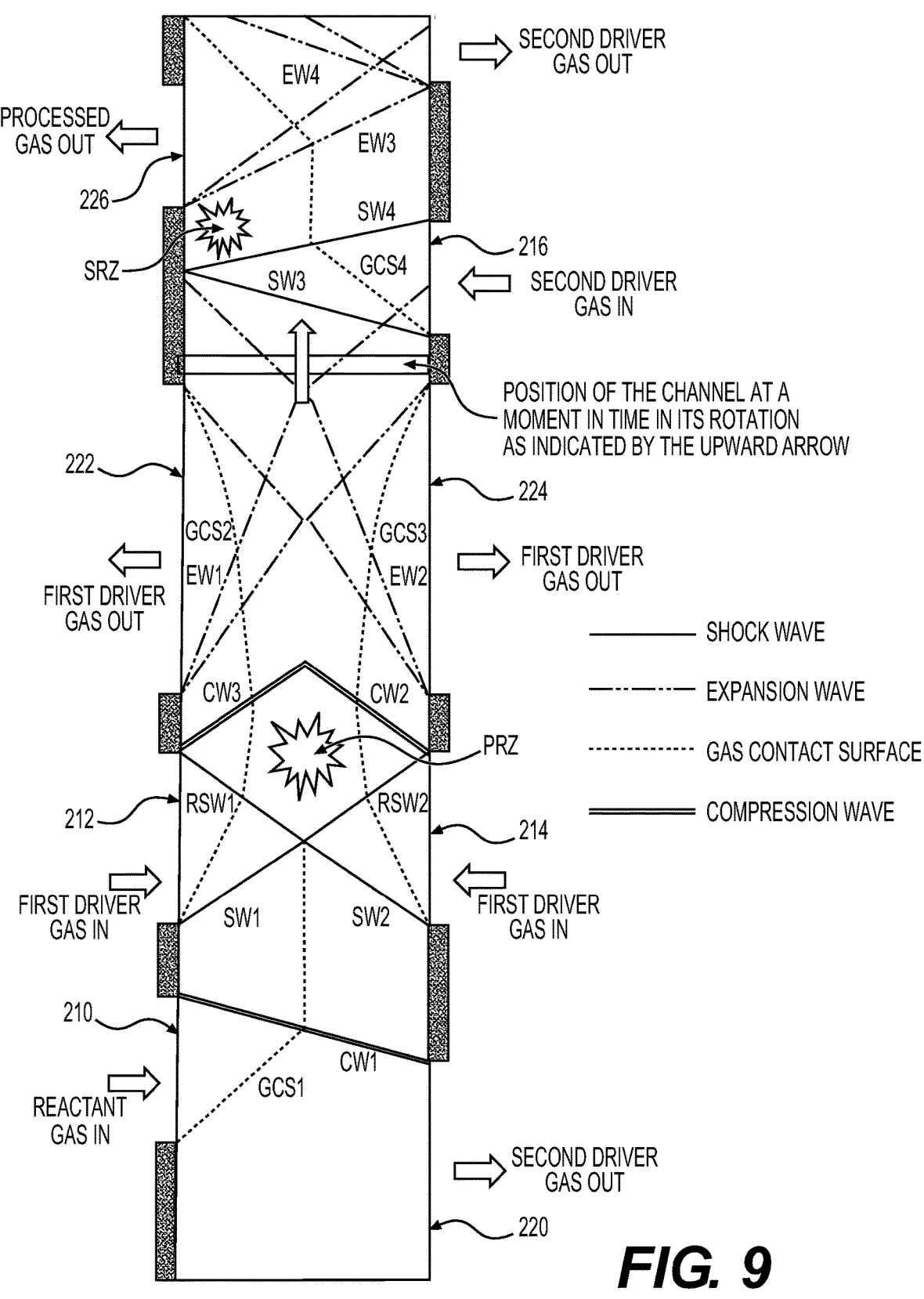
FIG. 9 shows a wave diagram corresponding to eight-port wave reformer of FIG. 8.

The inner working fluid principles are shown in a wave diagram in FIG. 9. The new eight-port design still allows the reacting gas to enter and leave at the same end of the rotor via inlet port 210 and exhaust port 226, and different portions of a first driver fluid/gases are forced into the rotor, one portion through the first entry port 212 (on the left side of the diagram) and a second portion though a second entry port 214 (on the right-hand side of the diagram), and these are being respectively discharged from the same side as the inlet ports via exhaust ports 222 and 224. Thus, the bottom part of the cycle shown in FIG. 9 is similar to that in FIG. 7, but at the top part a second driver gas enters via inlet port 216 into the channel when the right end of the channel is exposed to the secondary driver gas port 216. Hence, an additional set of incidence and reflected shock waves SW3 and SW4 creates a substantially motionless secondary reaction zone SRZ behind the reflected shock wave SW4. This secondary reaction zone contributes to more hydrogen generation in addition to that generated in the primary reaction zone (PRZ). The processed gas leaves the channel through the outlet port 226 placed at the left end wall 205. The port 226 remains open long enough to complete the scavenging of the processed gas facilitated by an expansion wave EW3 generated at the lower corner of the outlet port 226. As the right end of the channel opens to another exhaust port 220, an expansion fan EW 4 originates from the leading edge of the exhaust port 220 and propagates upstream into the channel, expanding and discharging the secondary driver gas to exhaust portion of the balance of systems, and the cycle repeats.

When introducing elements of various aspects of the present invention or embodiments thereof, the articles "a," "an," "the" and "said" are intended to mean that there are one or more of the elements, unless stated otherwise. The terms "comprising," "including" and "having," and their derivatives, are intended to be open-ended terms that specify the presence of the stated features, elements, components, groups, and/or steps, but do not exclude the presence of other unstated features, elements, components, groups, and/or or steps and mean that there may be additional features, elements, components, groups, and/or steps other than those listed. Moreover, the use of "top" and "bottom," "front" and "rear," "above," and "below" and variations thereof and other terms of orientation are made for convenience but does not require any particular orientation of the components. The terms of degree such as "substantially," "about" and "approximate," and any derivatives, as used herein mean a reasonable amount of deviation of the modified term such that the end result is not significantly changed. For example, these terms can be construed as including a deviation of at least +/−5% of the modified term if this deviation would not negate the meaning of the word it modifies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A hydrogen generation system comprising a multi-port wave reformer, including a rotor rotating within an outer casing and supporting end walls at opposite ends thereof, in which shock and expansion waves are created at two spaced apart locations in said rotor and in a manner causing head-on colliding shock waves and multi-stage compression where reacting gases within the wave reformer are heated and compressed to thermally crack or decompose one or more fuel sources to generate a fuel product containing hydrogen, wherein the multi-port wave reformer comprises an eight-port wave reformer including a reactant inlet port on one of said opposite end walls for admitting a reactant fluid and a reactant exhaust port on the same said one of said opposite end walls and spaced from said reactant inlet port for exhausting processed reactant fluid, whereby the reactant fluid can enter and be exhausted from the same end of the rotor, separate inlet ports on each of said opposite end walls for inputting a first driver fluid, as well as separate exhaust ports on each of said opposite end walls for exhausting the first driver fluid, and a second driver fluid inlet port on the other of said opposite end walls for inputting a second driver fluid, as well as a separate second driver fluid exhaust port on said other of said opposite end walls spaced from said second driver fluid inlet port.

2. The hydrogen generation system as in claim 1 wherein the fuel source can comprise a hydrocarbon fuel.

3. A hydrogen generation system comprising an eight port wave reformer, including a rotor rotating within an outer casing and supporting end walls at opposite ends thereof, a reactant fluid input port at one of said opposite ends of the rotor for inputting a reactant fluid into the reformer in which shock and expansion waves are created in the rotor following the input of each of a first driver fluid through each of the end walls at both opposite ends of the rotor, and next following the input of a second driver fluid through the other of said one of said opposite end walls, thereby causing multi-stage shock compression at spaced apart locations in said rotor where reacting fluids gases remain for a longer time within the eight port wave reformer and are heated and compressed to thermally crack or decompose one or more fuel sources to generate a fuel product containing hydrogen that is thereafter exhausted from said rotor from a processed reactant fluid exhaust port located on said one of said opposite ends of the rotor and spaced from said reactant fluid input port.

4. The hydrogen generation system as in claim 3 wherein the fuel source can comprise a hydrocarbon fuel.

5. The hydrogen generation system as in claim 3 wherein the eight port wave reformer develops spaced apart shock wave locations as each of the first and second driver fluids are admitted.

6. The hydrogen generation system as in claim 5, wherein said processed reactant fluid exhaust port discharges processed reactant fluid that includes hydrogen following a second shock wave location.

7. The hydrogen generation system as in claim 3, wherein the eight ports include two sets of four ports at each opposing end of said rotor, each of said sets of four ports including two spaced apart inlet portion and two spaced apart exhaust ports.

8. The hydrogen generation system as in claim 3 for wherein a set of four ports at one end includes separate inlet ports for a reactant fluid and a first driver fluid, as well as separate exhaust ports for processed reactant fluid and a first portion of said first driver fluid, and a set of four ports at an opposite end includes separate inlet ports for another portion of the first driver fluid and a second driver fluid, as well as separate exhaust ports for each of a second portion of said first driver fluid and the second driver fluid.

9. An eight-port wave reactor having a plurality of inlet ports and exhaust ports provided in a pair of opposing end walls thereof, with a first pair of spaced apart inlet and exhaust ports on one of said pair of opposing end walls of the wave reactor that collectively allows a driven reactant fluid to enter and leave as a processed reactant fluid that includes hydrogen from said one of said pair of opposing end walls of the wave reactor, an additional pair of spaced apart inlet and exhaust ports on the each of said pair of opposing end walls of the wave reactor that collectively allow a first driver fluid to enter and leave from each of said pair of opposing end walls of the wave reactor, and an additional pair of spaced apart inlet and exhaust ports on another one of said pair of opposing end walls of the wave reactor that collectively allow a second driver fluid to enter and leave from said another one of said pair of opposing end walls of the wave reactor to thereby cause shock waves to be created as a consequence of inputting of each of the first and second driver fluids to thereby compress and thermally crack or decompose fuel sources to generate said processed reactant fluid.

* * * * *